(12) United States Patent
Marini

(10) Patent No.: US 10,150,266 B2
(45) Date of Patent: Dec. 11, 2018

(54) SEALANT LIQUID CONTAINER

(71) Applicant: TEK GLOBAL S.R.L., Pesaro (IT)

(72) Inventor: Maurizio Marini, Pesaro (IT)

(73) Assignee: Tek Global S.R.L., Pesaro (IT)

( * ) Notice: Subject to any disclaimer, the term of this patent is extended or adjusted under 35 U.S.C. 154(b) by 61 days.

(21) Appl. No.: 15/110,232

(22) PCT Filed: Jan. 29, 2015

(86) PCT No.: PCT/IB2015/050686
§ 371 (c)(1),
(2) Date: Jul. 7, 2016

(87) PCT Pub. No.: WO2015/114564
PCT Pub. Date: Aug. 6, 2015

(65) Prior Publication Data
US 2016/0332397 A1    Nov. 17, 2016

(30) Foreign Application Priority Data
Jan. 29, 2014    (IT) .............................. TO2014A0063

(51) Int. Cl.
| B29C 73/16 | (2006.01) |
| B65D 83/30 | (2006.01) |
| B65D 83/40 | (2006.01) |
| B29L 30/00 | (2006.01) |
| B29L 31/26 | (2006.01) |

(52) U.S. Cl.
CPC .......... *B29C 73/166* (2013.01); *B65D 83/303* (2013.01); *B65D 83/40* (2013.01); *B29L 2030/00* (2013.01); *B29L 2031/26* (2013.01)

(58) Field of Classification Search
CPC ...... B29C 73/166; B65D 83/40; B65D 83/303
USPC ............................................ 141/38, 100–105
See application file for complete search history.

(56) References Cited

U.S. PATENT DOCUMENTS

| 4,096,974 A * | 6/1978 | Haber ................ B65D 47/2043 |
| | | 222/402.13 |
| 5,388,620 A * | 2/1995 | Lasserre ................ B65D 83/42 |
| | | 137/854 |
| 6,260,739 B1 * | 7/2001 | Hsiao .................... B65D 83/205 |
| | | 137/355.28 |
| 6,708,849 B1 * | 3/2004 | Carter .................... B65D 83/20 |
| | | 222/153.1 |
| 7,694,698 B2 * | 4/2010 | Marini .................. B29C 73/166 |
| | | 141/38 |

(Continued)

FOREIGN PATENT DOCUMENTS

| DE | 20 2009 002 661 U | 8/2009 |
| EP | 1 493 550 A1 | 1/2005 |

(Continued)

*Primary Examiner* — Timothy L Maust
(74) *Attorney, Agent, or Firm* — Ladas & Parry LLP

(57) ABSTRACT

A container for sealant liquid to repair an inflatable article, preferably pneumatic, comprises a shell defining an inner volume for a sealant liquid, an inlet port for introduction of a gas under pressure into the inner volume, an outlet port for injection of the sealant liquid after pressurisation of the inlet port and a flexible tube connected to the outlet port. The container also comprises a case detachable from the shell and surrounding the flexible tube when it is connected to the shell.

12 Claims, 4 Drawing Sheets

(56) References Cited

U.S. PATENT DOCUMENTS

| | | | | |
|---|---|---|---|---|
| 8,297,321 | B2 * | 10/2012 | Chou | B29C 73/166 141/38 |
| 8,439,089 | B2 * | 5/2013 | Guan | B29C 73/166 141/104 |
| 9,079,675 | B2 * | 7/2015 | Vervoort | B65D 83/201 |
| 9,227,469 | B2 * | 1/2016 | Jhou | B29C 73/163 |
| 9,242,416 | B1 * | 1/2016 | Ohm | B29C 73/166 |
| 9,545,763 | B2 * | 1/2017 | Chou | B29C 73/025 |
| 2004/0159365 | A1 * | 8/2004 | Cowan | B29C 73/166 141/38 |
| 2008/0092984 | A1 | 4/2008 | Marini | |
| 2010/0108186 | A1 * | 5/2010 | Yoshida | B29C 73/166 141/38 |
| 2012/0037267 | A1 * | 2/2012 | Senno | B29C 73/166 141/38 |
| 2015/0059921 | A1 * | 3/2015 | Jhou | B29C 73/166 141/38 |

FOREIGN PATENT DOCUMENTS

| | | | | |
|---|---|---|---|---|
| EP | 1 749 645 | A1 | 2/2007 | |
| EP | 1 894 707 | A1 | 3/2008 | |
| EP | 1894707 | A1 * | 3/2008 | B29C 73/166 |
| WO | WO 2017212438 | A1 * | 12/2017 | B29C 73/166 |

\* cited by examiner

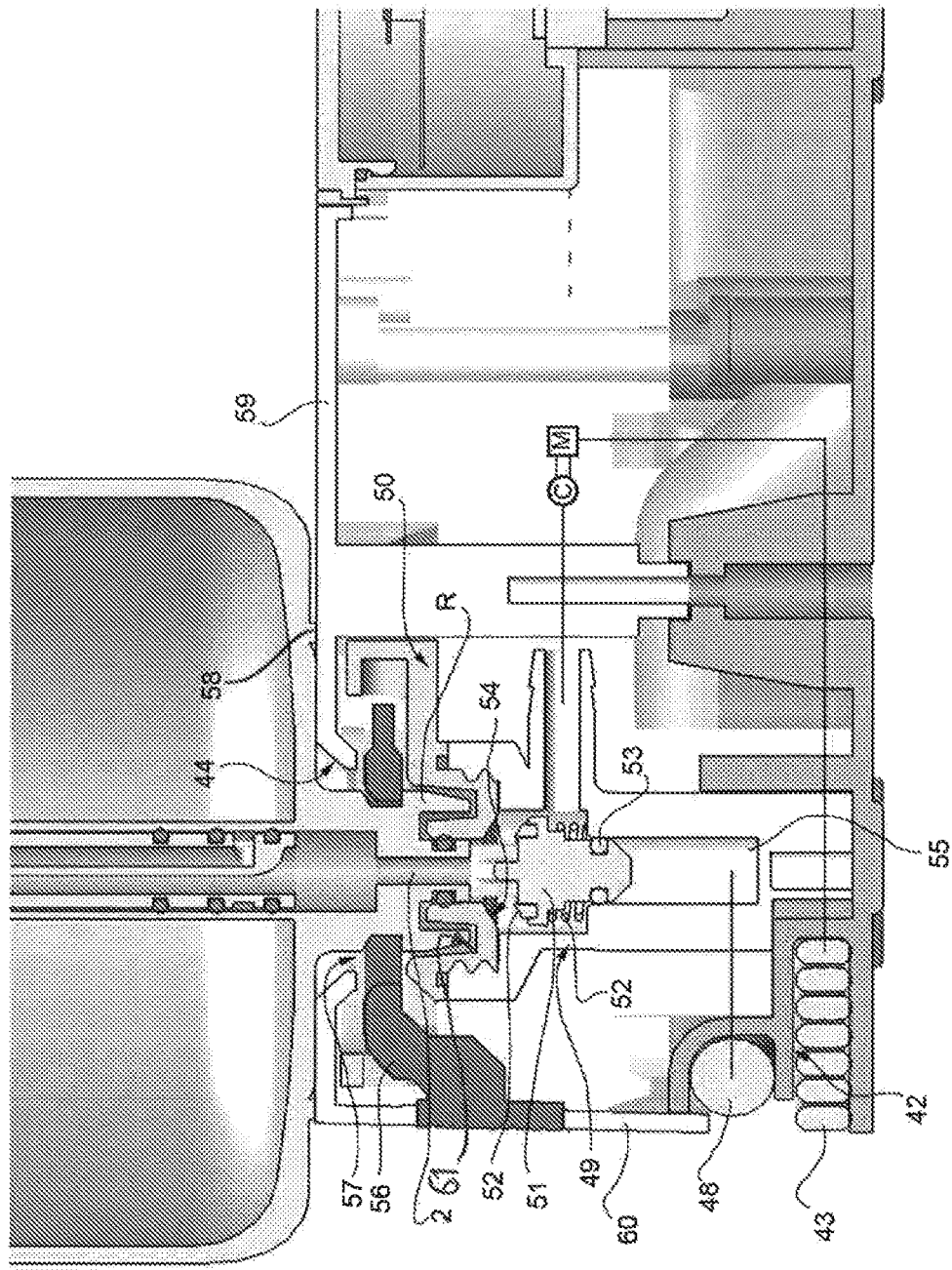

SEALANT LIQUID CONTAINER

CROSS-REFERENCE TO RELATED APPLICATION

This U.S. application claims priority under 35 U.S. 371 to, and is a U.S. National Phase application of, the International Patent Application No PCT/IB2015/050686, filed 29 Jan. 2015, which claims priority from IT TO2014A000063 filed 29 Jan. 2014, the disclosures of which are incorporated in their entirety by reference herein.

TECHNICAL FIELD

The present invention relates to a container for sealant liquid for repairing inflatable objects, in particular pneumatic, and to a repair and inflation kit comprising such a container.

BACKGROUND ART

Containers of sealant liquid are known comprising a bottle and a fluid assembly connected to the bottle and having an inlet and an outlet. In particular, the inlet and the outlet are arranged on the same side of the container and close to a mechanical and/or fluid connection of the container with a compressor and/or with a support to keep the container in a position of use.

This results in a relatively significant complication of the connection area between container and the compressor or support and places restrictions on the geometry of the compressor or support for container and of the connection with the compressor. The components required indeed tend to be close and this may require the creation of passages with intricate paths.

In particular, the container comprises a flexible tube which the user connects directly to the inflatable article for the repair, and it is important for the flexible tube be protected against possible damage while not in use.

DISCLOSURE OF INVENTION

The object of the present invention is to make a container for a sealant liquid which is at least partly exempt from the drawbacks specified above.

The object of the present invention is achieved by a container for sealant liquid according to claim 1.

BRIEF DESCRIPTION OF THE DRAWINGS

The present invention will now be described with reference to the accompanying drawings, which illustrate a non-limiting exemplary embodiment thereof, in which:

FIG. 4 is a longitudinal section of an area for mechanical and fluid connection between the container in FIG. 1 and the compressor in FIG. 3.

BEST MODE FOR CARRYING OUT THE INVENTION

Figure 1:
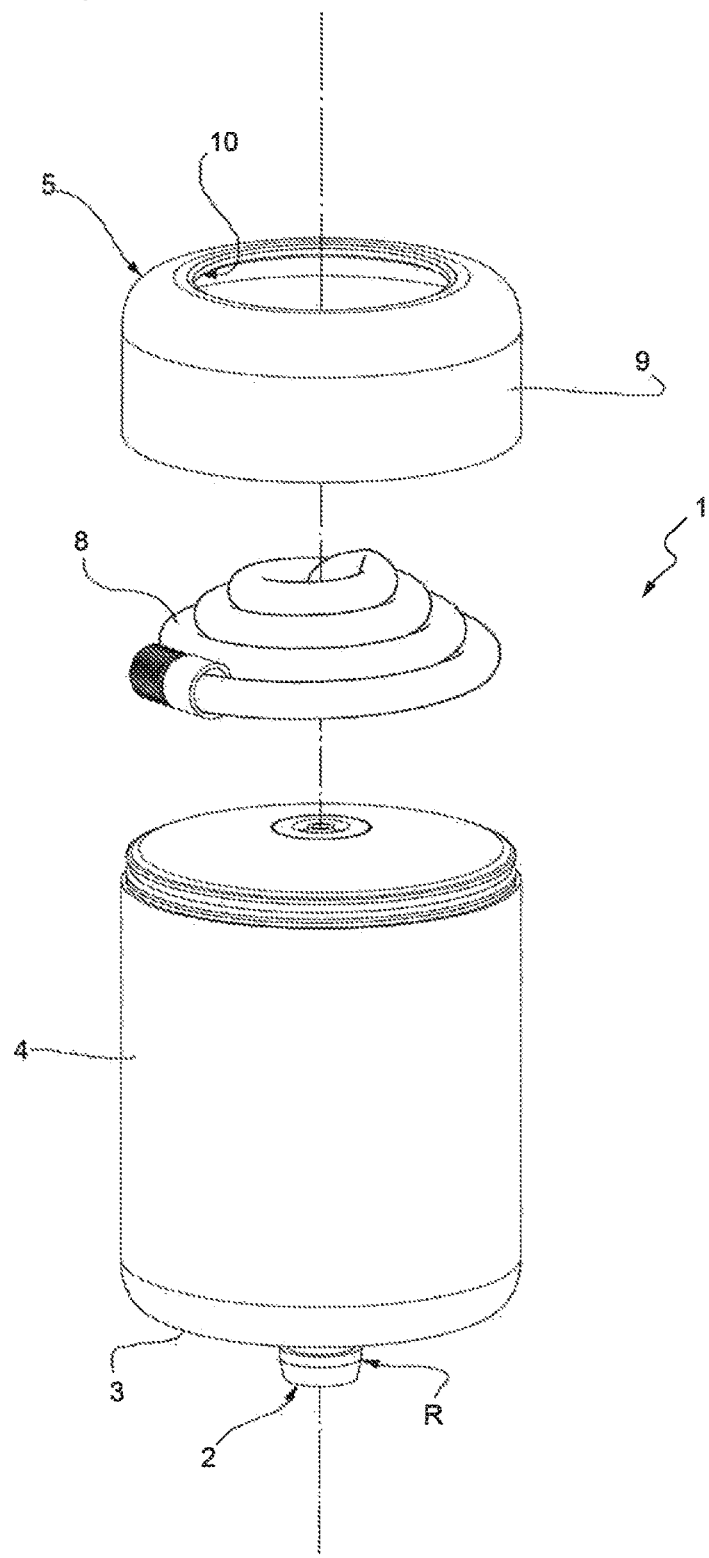
FIG. 1 is a perspective view of a container for a sealant liquid according to the present invention.

Numeral 1 in FIG. 1 illustrates a container for a sealant liquid as a whole, having an inlet port 2, a bottom 3 defining the inlet port 2, a side wall 4 coming out of bottom 3 and a head portion 5 mutually opposed to bottom 3 with respect to the side wall 4.

The head portion 5 comprises a head wall 6 fixed to the side wall 4 to define an inner volume 7, a flexible outlet tube 8 connectible directly to an inflatable article, preferably pneumatic, and a case 9 fixed in releasable way to the side wall 4 and/or to the head wall 6 to hold and protect the flexible outlet tube 8 when container 1 is not in use. Bottom 3, the side wall 4 and the head wall 6 define a shell for containing a predefined quantity of sealant liquid suitable for repairing an inflatable article, for example pneumatic.

Preferably, case 9 comprises a concave shell which, with the head wall 6, defines a housing volume inside of which the flexible outlet tube 8 is wound when case 9 is fixed to the side wall 4 and/or to the head wall 6 and container 1 is not in use.

Advantageously, case 9 is configured so that the flexible outlet tube 8 is visible from the outside when case 9 is fixed to the side wall 4 and/or to the head wall 6. To such an end, case 9 defines an opening 10 or an area for transparent or translucent material. As shown in the figures, case 9 is preferably a cap.

The inlet port 2 on the opposing longitudinal side of the flexible outlet tube 8 is surrounded by a single sealing ring 11, for example an O-ring, and the latter is surrounded by an annular wall 12 which faces and surrounds the sealing ring 11 to protect the latter for example during transport and/or during connection with a compressor.

The inlet port 2 and the annular wall 12 define a projection R of bottom 3 which connects to a pressurised air source as described below.

In container 1, the inner volume 7 accommodates a closure unit 13 which connects the inlet port 2 to an outlet port 14 and comprises a mobile element 15 configurable in a closed position in which the sealant liquid is held and stored in the inner volume 7 and container 1 may be stored while waiting to be used, and an open position reached after pressurisation of the inlet port 2 in which the inlet port 2 and the outlet port 14 are connected by means of the inner volume 7. The outlet port 14 is in turn connected to the flexible outlet tube 8 to inject the sealant liquid into a pneumatic object when the inlet port 2 is pressurised and the closure unit 13 is configured in the open position. The inlet port 2 and the outlet port 14 are on opposing end sides with respect to the inner volume 7 and the sealant liquid flows at least a length from bottom 3 to the head wall 6 inside the closure unit 13 during injection.

Preferably, the mobile element 15 moves in a rectilinear direction defined by means of a guide 16 arranged preferably between the inlet and outlet ports 2, 14. Advantageously, guide 16 is tubular and accommodates the mobile element 15 which carries a plurality of sealing rings sliding on guide 16.

Figure 2:
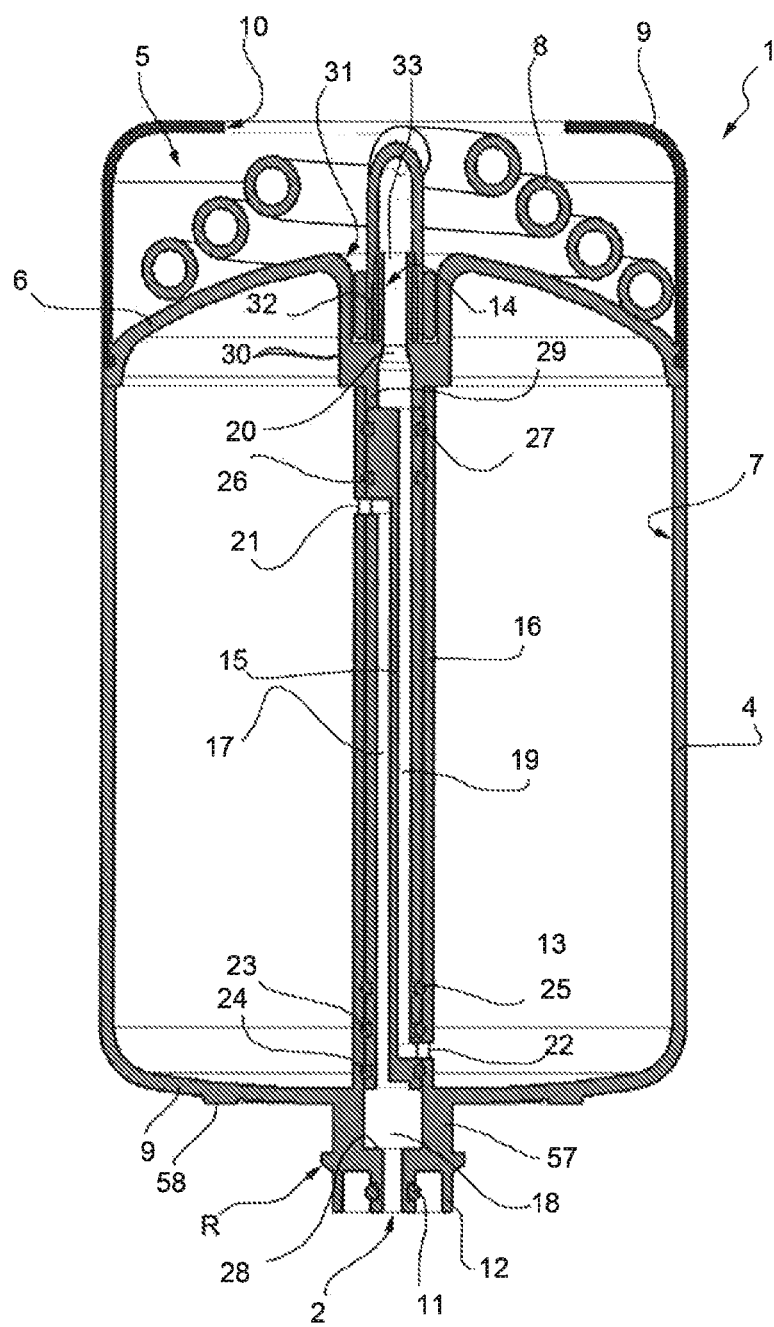
FIG. 2 is a longitudinal section of the container in FIG. 1.

The mobile element 15 defines a first passage 17, in particular a conduit, which leads into an inlet 18 of the closure unit 13 and a second passage 19, in particular a conduit, which leads into an outlet 20 of the closure unit 13 defined by the head wall 6 (FIG. 2). Furthermore, in the open position shown in FIG. 2, passage 17 leads into the inner volume 7 through an opening 21 defined by guide 16 and passage 19 leads into the inner volume 7 by means of an opening 22, it also defined by guide 16. In particular, opening 21 is closer to outlet 20 than opening 22 in the longitudinal direction of movement of the mobile element 15 along guide 16.

The travel of the mobile element 15 and the position of the sealing rings depends on the position of the openings 21, 22. In the position in FIG. 2, sealing rings 23, 24 are spaced apart in longitudinal direction to be on opposing sides with respect to opening 22. In closed position, a third sealing ring 25 on the opposing side to ring 24 with respect to ring 23, is arranged so as to be mutually opposed to the latter with respect to opening 22.

The mobile element 15 also carries two other sealing rings 26 and 27, spaced apart in direction to be on opposing sides of opening 21 when the mobile element 15 is in the closed position. Guide 16 has continuous walls at least in the contact zone with the sealing rings 23-27 so that when the closure unit 13 is in the closed position, the openings 21, 22 are sealed with respect to inlet 18 and to outlet 20. Furthermore, in the open position, the sealing ring 24 isolates opening 22 from inlet 18.

Container 1 may be made by friction welding components made by injecting and moulding a plastic material. Preferably, bottom 3, the side wall 4 and guide 16 are made in a single concave body. Wall 6 is made by moulding in a single body. Furthermore, the mobile element 15 is mounted on guide 16 in the closed position and the predetermined quantity of sealant liquid for the repair is poured into the hollow body defined by bottom 3 and by the side wall 4. Finally, the head wall 6 is welded on said hollow body. When the friction welding is welding by rotation, the side wall 4 may be cylindrical.

To delimit the closed position of the mobile element 15 in particular during assembly, there is provided a stop which is preferably arranged inside projection R of bottom 3 defining the inlet port 2.

To delimit the open position of the mobile element 15, there is provided a stop 29 preferably defined by a tubular element 30 of the head wall 6 which couples with guide 16 and defines outlet 20. The tubular element 30 defines a cavity 31 of the head wall 6 facing towards case 9. Preferably, an end portion 32 of the flexible outlet tube 8 inside cavity 31 is firmly, irremovably connected mechanically to the head wall 6. Advantageously, the head wall 6 comprises a connector 33 inside cavity 31 and on which the end portion 32 is fitted and possibly fixed by means of a retaining ring.

Figure 3:
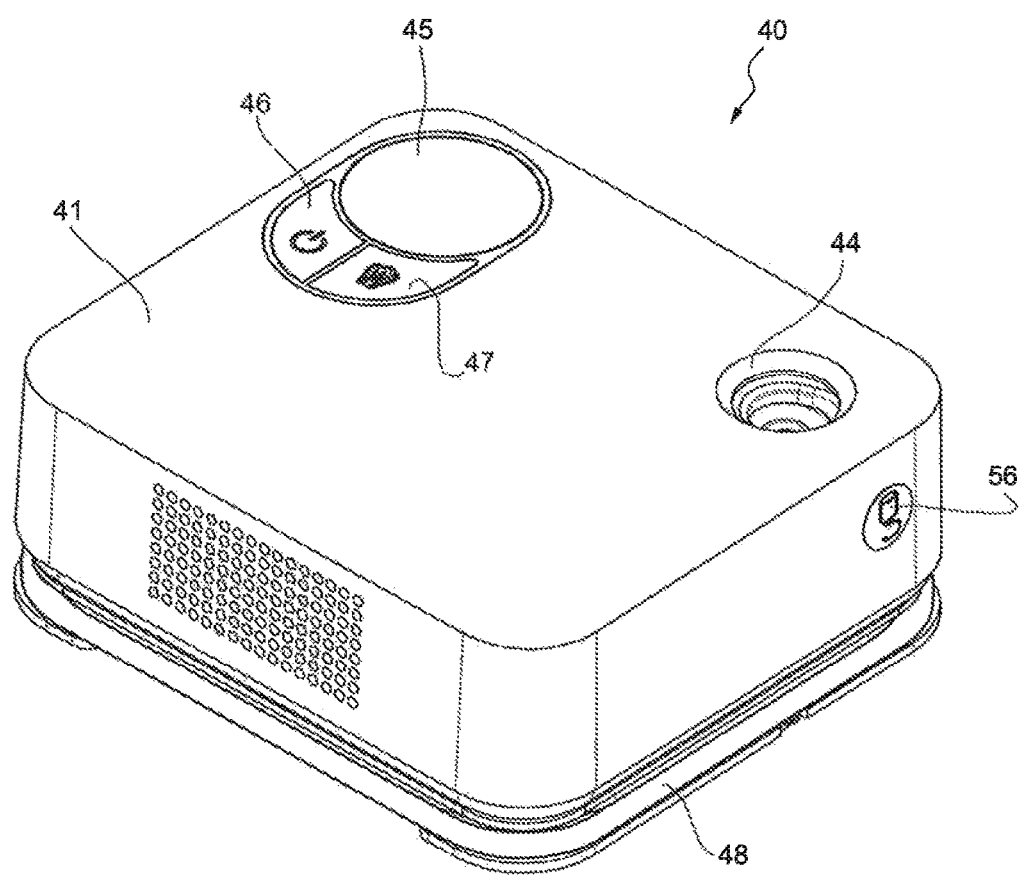
FIG. 3 is a perspective view of a compressor connectible to the container in FIG. 1.

FIG. 3 shows a compressor unit 40 connectible to container 1 to form a repair and inflation kit for inflatable articles, preferably pneumatic.

The compressor unit 40 comprises a casing 41 accommodating an electric motor M and a compressor C (shown only diagrammatically) driven by the electric motor M. In a lower area, shell 40 defines a groove 42 for accommodating an electrical cable 43 to be connected to a source of electric voltage for supplying the electric motor M.

In an upper area, casing 41 defines an opening 44 connected to compressor C and configured to accommodate projection R defining the inlet port 2 so that the latter may receive a flow of pressurised air. Furthermore, the compressor unit 40 comprises a manometer 45, a push button 46 for turning on the electric motor M and a push button 47 for activating a relief valve (not shown) to prevent overpressures in a fluid line on board the compressor unit 40 and/or to lower the pressure of the pneumatic object if the manometer signals excessive pressure. The fluid line of the compressor unit 40 comprises passages and/or channels and/or conduits for transmitting a flow of pressurised air to opening 44.

The compressor unit 40 also comprises a flexible tube 48 connected to compressor C in parallel to opening 44 so as to follow an operation of inflating and/or regulating the pressure also when container 1 is not connected to opening 44. In use, the flexible tube 48 is connected by the user directly to the pneumatic object to perform the operation of regulating the pressure. Similarly, the flexible outlet tube 8 is also connected directly to the pneumatic object by the user.

FIG. 4 shows a detail of the mechanical and fluid connection between container 1 and compressor 40. In particular, the kit comprises a valve body 49 fluidly connected or connectible to compressor C, and a retaining interface 50 for keeping container 1 connected to compressor C in a position ready for use. The valve body 49 is fluidly connected to opening 44 and to the flexible tube 48 so that the latter and container 1 are in parallel with respect to compressor C.

A shutter 51 of the valve body 49 is kept in a position by a spring 52 such that opening 44 is fluidly closed and compressor C is connected to the flexible tube 48. Thereby, when the electric motor M is turned on, the pressurised air may inflate the pneumatic object by means of the flexible tube 48.

FIG. 4 shows a further position of shutter 51 in which compressor C is fluidly connected to opening 44 to pressurise container 1 and the flexible tube 48 is isolated from compressor C. Opening 44 and the flexible tube 48 are fluidly isolated by means of respective seals 52, 53 which selectively close respective passages 54 and 55: passage 54 is fluidly connected to opening 44 and passage 55 is fluidly connected to the flexible tube 48. Thus, the valve body 49 is three-way and with the passages 54, 55, is part of the fluid line of the compressor unit 40.

The retaining interface 50 is preferably connected to the valve body 49 to define at least a length of passage 54 and comprises a mobile insert 56 engaging selectively in a recess 57 of projection R defining the inlet port 2 of container 1. Recess 57 is therefore a mechanical connection for connecting container 1 to a support, in particular to casing 41, so that the container is kept in a position of use for the injection of the sealant liquid.

Preferably, the retaining interface 50 and recess 57 are configured so that a support 58 on bottom 3 of container 1 contacts a head wall of casing 41. Support 58 surrounds both the inlet port 2 and opening 44, and may be continuous or annular, or discontinuous and follow a sector of circumference. Support 58 is longitudinally spaced apart from recess 57 and has a non-vertical surface, preferably horizontal, so as to substantially load, for example more than 50%, the weight of container 1 on the head wall 59 when container 1 is connected to the compressor unit 40 and is ready for use. Preferably, casing 41 comprises an upper shell 60 made by means of injection moulding of a plastic material, and the head wall 59 is part of said shell.

Preferably, the retaining interface 50 is connected to the valve body 59 cold to prevent damaging seal 52, preferably by means of both a releasable and non-releasable threaded or snap connection.

Furthermore, as shown in FIG. 4, the retaining interface 50 defines an annular seat 61 which surrounds a portion of passage 54 which can be coupled fluidly with the inlet port 2. The annular seat 61 accommodates the annular wall 12 when container 1 is coupled to compressor 40.

In use, container 1 is assembled on compressor 40 to inject the sealant liquid. When the mobile element 15 is moved to the open position, the level of sealant liquid may be both below and above opening 21. The pressure inside container 1 pushes the sealant liquid towards the outlet port 14 through opening 22, which is close to bottom 3. To allow a more effective flow of sealant liquid towards opening 22, bottom 3 converges towards opening 22, and the latter is surrounded by converging walls as shown in FIG. 2.

Container 1 and kit 1, 40 according to the present invention allow the following advantages to be obtained.

Case 9 protects the flexible outlet tube 8 before the container is used and the flexible outlet tube 8 may be easily identified by the user by means of opening 10.

The connection interface with compressor 40 is simplified. Furthermore, it is possible to connect container 1 also in middle areas of compressor 40 without there being a need to provide a seat or other interface for the flexible outlet tube 8.

Support 58 and recess 57 are arranged to define a particularly compact mechanical connection of the container in axial direction.

Container 1 is shaped to be made by means of friction welding to increase the resistance to pressure and reduce the risk of undesired losses of sealant liquid.

It is finally apparent that modifications or variants may be made to container 1 and to kit 1, 40 herein described and illustrated, without departing from the scope of protection as defined by the appended claims.

In particular, the valve body 49 and the retaining interface 50 may also be used in kits not comprising a compressor but in any case suitable for being connected to a pressurised air source, such as for example a pneumatic brake system of a heavy vehicle. In such a case, opening 44 is permanently connected to the fluid line and the latter is connectible to the pressure source in a releasable way. The fluid line is accommodated in a shell, for example similar to casing 41, which contributes to keeping or keeps container 1 in a position suitable for injecting sealant liquid.

The invention claimed is:

1. A container for sealant liquid to repair an inflatable article, comprising a shell defining an inner volume for a sealant liquid, an inlet port located on one side of the container for introduction of a gas under pressure into the inner volume, an outlet port located on the opposite side of the container from the inlet port, said outlet port being configured for injection of the sealant liquid into said inflatable article after pressurization of the inlet port and a flexible tube connected to the outlet port, comprising a case which together with a head wall of the shell, defines a housing volume inside of which the flexible tube is wound, said case being detachable from the shell and surrounding the flexible tube when it is connected to the shell, said container further comprising a closure unit configurable between a closed position, wherein the sealant liquid is held in the inner volume and an open position reached after pressurisation of the inlet port, wherein the inlet port and the outlet port are connected by means of the inner volume said closure unit comprising an inlet fluidly connected to the inlet port and an outlet fluidly connected to the outlet port and at least one passage to connect to each other the inlet and the outlet so that the pressure at the inlet port is transmitted to the outlet port wherein said passage defined by said mobile element comprises a first portion and a second portion, said first portion fluidly connecting the inlet with the inner volume and said second portion connecting the inner volume with the outlet.

2. A container according to claim 1 wherein the case is connectible to a head wall and/or to a side wall of the shell.

3. A container according to claim 1, wherein the case is a cap.

4. The container according to claim 1, wherein said case presents a translucent and/or transparent portion and/or an opening arranged so that the flexible tube is visible when the case is connected to the shell and the flexible tube is inside the case.

5. The container according to claim 1, wherein the shell comprises a first end portion and a second end portion mutually opposed with respect to the inner volume and by the case being connected to the shell so that the flexible tube is enclosed between the case and one of said first and second end portions.

6. The container according to claim 1, comprising a connection adapted to be connected to a support to define a position of use of the container, said connection-being arranged on one of said first and second end portions on the opposing side of the case.

7. The container according to claim 1 wherein the closure unit comprises a mobile element sliding along a guide and in that the passage is defined by said mobile element.

8. The container according to claim 1, wherein said passage is fluidly connected to the inner volume by means of a first and a second port respectively, the first port having a distance from the outlet port which is shorter with respect to the one of the second port.

9. The container according to claim 1, wherein said inlet port is surrounded by a sealing ring and by comprising an annular wall facing and surrounding the sealing ring.

10. A container according to claim 1, wherein said shell comprises a head wall defining a cavity and in that the flexible tube comprises an end portion, said end portion being connected mechanically to the head wall in the cavity.

11. The container according to claim 1 wherein said inlet port is connected to a conduit located within said container having an outlet into said inner volume at a point distant from said inlet port.

12. The container according to claim 11 wherein said outlet port is connected to a conduit located within said container said conduit having an inlet from said inner volume at a point distant from said outlet port.

* * * * *